(12) United States Patent
Itoh et al.

(10) Patent No.: US 9,002,843 B2
(45) Date of Patent: Apr. 7, 2015

(54) SYSTEM AND METHOD FOR EXTRACTION OF OFF-TOPIC PART FROM CONVERSATION

(71) Applicant: International Business Machines Corporation, Armonk, NY (US)

(72) Inventors: Nobuyasu Itoh, Kanagawa (JP); Masafumi Nishimura, Kanagawa (JP); Yuto Yamaguchi, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 13/740,473

(22) Filed: Jan. 14, 2013

(65) Prior Publication Data

US 2013/0185308 A1    Jul. 18, 2013

(30) Foreign Application Priority Data

Jan. 13, 2012   (JP) .................................. 2012-004802

(51) Int. Cl.
*G06F 7/00* (2006.01)
*G06F 17/30* (2006.01)
*G06F 17/27* (2006.01)

(52) U.S. Cl.
CPC ........ *G06F 17/3053* (2013.01); *G06F 17/2785* (2013.01); *Y10S 707/99933* (2013.01)

(58) Field of Classification Search
CPC .......................... G06F 17/2785; G06F 17/3053
See application file for complete search history.

(56) References Cited

U.S. PATENT DOCUMENTS

| 2008/0300872 A1* | 12/2008 | Basu et al. ..................... 704/235 |
| 2009/0204609 A1* | 8/2009 | Labrou et al. ..................... 707/5 |
| 2010/0290699 A1* | 11/2010 | Adam et al. ................... 382/155 |
| 2012/0330968 A1* | 12/2012 | Lee et al. ....................... 707/748 |

FOREIGN PATENT DOCUMENTS

| JP | 2003050807 | 2/2003 |
| JP | 2003323424 | 11/2003 |
| JP | 2005352613 | 12/2005 |

OTHER PUBLICATIONS

Blei, D., et al., "Latent Dirichlet Allocation," Journal of Machine Learning Research, vol. 3, pp. 993-1022, submitted Feb. 2002, published Jan. 2003, copyright 2003 David M. Blei, Andrew Y. Ng and Michael I. Jordan.

(Continued)

*Primary Examiner* — Azam Cheema
(74) *Attorney, Agent, or Firm* — Fleit Gibbons Gutman Bongini & Bianco PL; Jose Gutman

(57) ABSTRACT

A system and method extract off-topic parts from a conversation. The system includes a first corpus including documents of a plurality of fields; a second corpus including only documents of a field to which the conversation belongs; a determination means for determination as a lower limit subject word a word for which IDF value for the first corpus and IDF value for the second corpus are each below a first certain threshold value; a score calculation part for calculation as a score a TF-IDF value for each word included in the second corpus; a clipping part, for sequential cutting out of intervals from text data that are contents of the conversation; and an extraction part for extraction as an off-topic part an interval where average value of the score of words included in the clipped interval is larger than a second certain threshold value.

9 Claims, 6 Drawing Sheets

(56) References Cited

OTHER PUBLICATIONS

Knights, D., et al., "Topic Drift with Compound Topic Models," AAAI, 242-245, 2009.

Cataldi, M., et al., "Emerging Topic Detection on Twitter based on Temporal and Social Terms Evaluation," MDMKDD '10, New York, NY copyright 2010, ISBN: 978-1-4503-0220-3; DOI 10.1145/1814249.

* cited by examiner

FIG. 6

| Extraction Accuracy(%) | Baseline | + Shared Word flooring(1) | (1) + Frequency ratio weighting(2) |
|---|---|---|---|
| Precision | 0.351 | 0.508 | 0.795 |
| Recall | 0.484 | 0.620 | 0.654 |
| F-measure | 0.407 | 0.559 | 0.718 |

SYSTEM AND METHOD FOR EXTRACTION OF OFF-TOPIC PART FROM CONVERSATION

CROSS-REFERENCE TO RELATED APPLICATION

This application is based upon and claims priority from prior Japanese Application No. 2012-004802 filed on Jan. 13, 2012, the entire disclosure of which is hereby incorporated by reference herein.

FIELD OF THE INVENTION

The present invention relates generally to technology for extraction of an off-topic part (i.e. chat) from conversation, and more specifically to a system and method for an off-topic part detection technology, and for extraction of an off-topic part in which definition and classification of a specific topic is difficult.

BACKGROUND OF THE INVENTION

The analysis of telephone conversations between persons in charge of business and customers at call centers or business branches has become increasingly important for business analytics. In particular, attention is being focused on the analysis of part of the conversation that is unrelated to the business transaction (i.e. chat or small-talk), rather than the essential conversation part (i.e. question or explanation about a certain product). This focus is due to such an off-topic part itself being thought to include information that may be used by the business, i.e. hobbies, family structure, or work of the customer. It is thus important to extract the off-topic part from the conversation data, use the extracted off-topic part for profiling of the customer, categorize the off-topic part, and then tie the off-topic part to the next business activity.

Therefore there exists considerable research on the extraction of a topic from conversation data or document data, analysis, and segmentation according to topic of data including various types of topics. For example, Non-Patent Literature 1 (see citation list below) discloses a latent Dirichlet allocation method. The expression "latent Dirichlet allocation method" here indicates a probabilistic model of the document generation process that is capable of expressing the fact that multiple topics are included in a single document, and this technique considers the document as a collection of words and allocates a topic for each word unit.

Moreover, Non-Patent Literature 2 and Patent Literature 1 disclose a technique for detection of a change of topic in accompaniment with the passage of time. For such a technique, Non-Patent Literature 2 discloses the introduction of a compound topic model (CTM), and Patent Literature 1 discloses use of a mixed distribution model, expression of a top generation model, and online training of the topic generation model while more severely forgetting as data become excessive.

Moreover, Non-Patent Literature 3 discloses technology for topic detection that acquires in real time a newly appearing topic expressed by a community. The lifecycle of a word (term) using this topic detection technology is modeled according to aging theory that considers the influence power of the source.

Moreover, Patent Literature 2 exists as background technology that infers the topic of conversation as the subject of the content of the conversation. Patent Literature 2 discloses technology to infer as the subject of conversation text a conversation subject in which there appears a high proportion of multiple words in the conversation text.

The background art of the aforementioned Non-Patent Literatures 1 to 3 and Patent Literature 1 is established by the assumption of modeling of topics, or alternatively, by assumption that such a part (word) occurs based on some sort of latent model and at least a part (words) of the data is constructed from at least 1 specific topic. For this reason, the aforementioned background art technology cannot be used of course for direct model formation and to define a specific topic and to detect the off-topic part for which classification itself is difficult. Moreover, it is difficult to use the technology of Patent Literature 2, which requires training data that is the topic of conversation based on the text copy and properties of the off-topic part and topic of conversation specifying the contents of such text copy.

Furthermore, in the explanation of the background art of Patent Literature 3, a TF-IDF model was introduced as technology for extraction of important expressions from the document. In the TF-IDF model, the importance of terms appearing in multiple documents is low, and conversely, the terms expressed infrequently in documents are considered to have high importance. The number of documents including a term among each term within a corpus that includes the subject document is found, the inverse thereof is used as the degree of importance of the term within the corpus, and the TF and total TF-IDF are used as the degree of importance of a term within a document. Therefore, use of the TF-IDF model has been considered for extraction of the off-topic part. That is to say, due to it being possible to say that the off-topic part is not related to the business transaction that is the primary conversation, the IDF value is anticipated to become high, and making of the value of TF-IDF into an indicator for such extraction is considered. Furthermore, the general definition of IDF is the log of the inverse of the proportion of documents that include a subject term among the corpus including the target document.

CITATION LIST

Patent Literature

Patent Literature 1: Japanese Unexamined Laid-open Patent Application No. 2005-352613.
Patent Literature 2: Japanese Unexamined Laid-open Patent Application No. 2003-323424.
Patent Literature 3: Japanese Unexamined Laid-open Patent Application No. 2003-50807.

Non-Patent Literature

Non-Patent Literature 1: Blei, D. M., Ng, A. Y., and Jordan, M. I., "Latent Dirichlet Allocation," Journal of Machine Learning Research, Vol. 3, pp. 993-1022, 2003.
Non-Patent Literature 2: Knights D., Mozer, M. C., and Nicolov N., "Topic Drift with Compound Topic Models," AAAI, 242-245, 2009.
Non-Patent Literature 3: Cataldi, M. et al., "Emerging Topic Detection on Twitter based on Temporal and Social Terms Evaluation," MDMKDD '10, 2010.

BRIEF SUMMARY

Technical Problems

However, although comparatively high speed processing is possible for the value of TF-IDF, extraction of uniqueness of a word is known to be unstable particularly for low frequency words. If the average value of TF-IDF of the word within a fixed interval of conversation is used as an off-topic part extraction indicator, the precision of the result of multiplication deteriorates further. Therefore rather than the target-domain corpus, by including multiple types of topics, and thus using a corpus that has a large size, it is thought possible to find a precise value of TF-IDF. However, use of a general corpus does not fit the objective of determining whether there is a target domain-specific topic or an off-topic part. For example, if the target domain is finance, although the word "limit" is not a difficult term, since this is generally a special term, the IDF value, which should have a low value, becomes large, and this results in association of inappropriately great importance.

Moreover, the use of flooring technology has been considered for the solution of the aforementioned problem of precision. That is to say, it is possible to improve precision by putting extremely low weighting on IDF values of a certain small size in the corpus of the target domain. However, also in this case, the expected effect with respect to the goal of off-topic part detection is not obtained. This is because, when using simple flooring technology, although a word may appear with a certain degree of high frequency in the corpus of the target domain, a word combining the characteristics of an off-topic part cannot be identified, and thus an extremely low weighting is applied to such a word.

Furthermore, according to the conventional TF-IDF model, although degree of importance within the document is found according to the frequency of appearance within the document (TF), the frequency of appearance of the word does not necessarily indicate the degree of importance when the object is off-topic part detection.

The present invention was achieved in consideration of the aforementioned problems of the conventional technology. An aspect of the present invention is to improve or apply the detection technology of characteristic words typified by TF-IDF, to derive a new indicator for extraction of the off-topic part, and to provide extraction technology based on this indicator. Moreover, an aspect of the present invention is to provide a system, method, and computer program product for off-topic part extraction that is capable of realization of precise execution of off-topic part detection based on an indicator that does not incur a calculation cost and without requiring training data.

Solution to Problems

In order to solve the aforementioned problems of the conventional technology, the present invention provides an off-topic part extraction system that has the below listed characteristic. The off-topic part extraction system of the present invention includes: a first corpus including documents of a plurality of fields; a second corpus including only documents of a field to which a conversation belongs; a determination means for determination as a lower limit subject word a word for which IDF value for the aforementioned first corpus and IDF value for the aforementioned second corpus are each below a first certain threshold value for each word included in the aforementioned second corpus; a score calculation part for calculation as a score a TF-IDF value for each word included in the aforementioned second corpus, the aforementioned score calculation part using a constant setting a lower limit rather than a TF-IDF value for the aforementioned lower limit subject word; a clipping part, while displacing a window of a certain length, for sequential cutting out of intervals subject to processing from text data comprising words that are contents of the aforementioned conversation; and an extraction part for extraction as an off-topic part an interval where average value of the aforementioned score of words included in the aforementioned clipped interval is larger than a second certain threshold value.

Preferably the conversation is conversation between a customer and a person in charge of business; the aforementioned second corpus is preferably formed from a customer-use corpus that is a collection of speech parts of a customer and an in-charge person-use corpus that is a collection of speech parts of the person in charge of business; and the aforementioned score calculation part, rather than TF value of each word w, preferably uses a proportion of appearance frequency $CF(w)$ of the aforementioned word w in the aforementioned customer-use corpus relative to appearance frequency $SF(w)$ of the aforementioned word w in the aforementioned in-charge person-use corpus.

Further preferably, the aforementioned proportion is found using the formula $(CF(w)+1)/(CF(w)+SF(w))$.

Further preferably, the aforementioned determination means, for each word included in the aforementioned second corpus, further determines as an upper limit subject word a word for which IDF value in the aforementioned first corpus and IDF value in the aforementioned second corpus each become greater than or equal to a third certain threshold value; and the aforementioned score calculation part uses a constant setting the aforementioned upper limit rather than a TF-IDF value for the aforementioned upper limit subject word.

Moreover, the aforementioned determination means, for each word included in the aforementioned second corpus, may determine as a lower limit subject word a word for which value of mutual information in the aforementioned first corpus and value of mutual information in the aforementioned second corpus each become less than or equal to a forth certain threshold value; and the aforementioned score calculation part may use mutual information content rather than IDF value, and use a constant for setting a lower limit for the aforementioned lower limit subject word rather than mutual information content.

Moreover, the aforementioned determination means, for each word included in the aforementioned second corpus, may determine as a lower limit subject word a word for which chi-square value in the aforementioned first corpus and chi-square value in the aforementioned second corpus each becomes less than or equal to a fifth certain threshold value; and the aforementioned score calculation part may use chi-square value rather than IDF value, and may use a constant for setting a lower limit for the aforementioned lower limit subject word rather than chi-square value.

The present invention was explained above as an off-topic part extraction system. However, the present invention may be understood as an off-topic part extraction method for extraction of the off-topic part from the conversation by execution by this type of off-topic part extraction system, and the present invention may be understood as an off-topic part extraction computer program that is executed on an information processing system with this type of method.

Effect of the Invention

According to the present invention, while using TF-IDF that does not impose a calculation cost as an indicator for off-topic part detection, two corpora are prepared (i.e. a general corpus that includes documents of multiple fields, and a target domain corpus that includes only documents of a field belonging to the conversation targeted for analysis). Since flooring is executed only when the IDF value becomes low for both corpora, it becomes possible to execute off-topic part detection with good precision. Furthermore, considering that a word that should be identified as an off-topic part would have a high frequency of appearance in the speech part of the customer in comparison to the speech part of the person in charge of business, if the ratio of such appearance frequencies is used in place of the appearance frequency (TF), it becomes possible to execute off-topic part extraction with much greater precision. Other effects of the present invention will be understood from the description of each embodiment.

BRIEF DESCRIPTION OF THE DRAWINGS

The drawings referenced in the present application are only used to exemplify typical embodiments of the present invention and should not be considered to be limiting the scope of the present invention.

FIG. 6 is a drawing showing results of an off-topic part detection experiment using the present invention.

DETAILED DESCRIPTION

Although the invention of the present application is explained in detail based on drawings of an embodiment, the below listed embodiment does not limit the invention in the scope of the claims, and all combinations of characteristics explained within the embodiment are not necessarily required to be means for solution of the invention. Furthermore, during the entire explanation of the embodiment, the same reference symbols are assigned to those elements that are the same.

Figure 1:
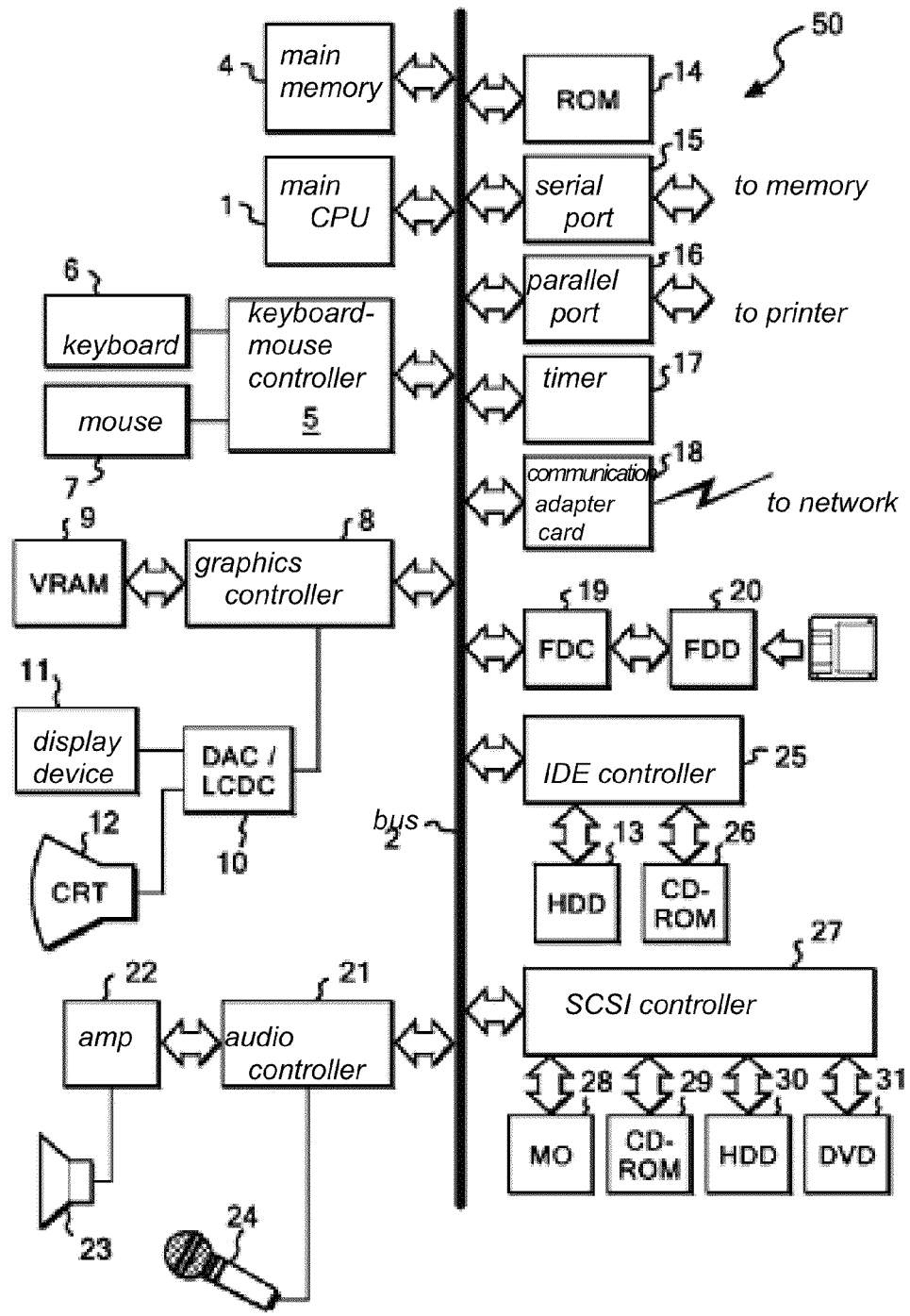
FIG. 1 shows an example of hardware configuration of an information processing system suitable for implementation of the off-topic part extraction system 200 according to an embodiment of the present invention.

FIG. 1 is a drawing showing one example of hardware configuration of a computer 50 used for implementation of an embodiment of the present invention. The computer 50 includes a main CPU 1 (Central Processing Unit) connected to a bus 2 and a main memory 4. The utilized CPU 1 is preferably based on a 32 bit or 64 bit architecture, i.e. a Core i (R) series CPU, Core 2 (R) series CPU, Atom (R) series CPU, Xeon (R) series CPU, Pentium (R) series CPU, or Celeron (R) series CPU manufactured by Intel Corp., or is a Phenom (R) series CPU, Athlon (R) series CPU, Turion (R) series CPU, or Sempron (R) CPU manufactured by AMD Corp.

Moreover, hard disk devices 13 and 30 and a removable storage device (external memory system for which the memory media may be exchanged, such as CD-ROM devices 26 and 29, a flexible disk device 20, a MO device 28, or a DVD device 31) is connected to the bus 2 through an IDE controller 25, SCSI controller 27, or the like. The memory medium (e.g., non-transitory computer readable medium such as a flexible disk, MO, CD-ROM, or DVD-ROM) is inserted into the removable storage device.

Although the various example embodiments of the present invention are discussed in the context of a fully functional computer system, those of ordinary skill in the art will appreciate that various embodiments are capable of being distributed as a computer program product via CD or DVD, e.g. CD-ROM 26, 29, or other form of recordable media. The computer program product includes a non-transitory computer readable medium and computer program instructions for a computer system to execute the methods according to embodiments of the present invention.

A command is imparted to the CPU 1 in coordination with the operating system so that code of a computer program for implementation of the present invention may be recorded to these memory media and hard disk devices 13 and 30, and ROM 14. That is to say, an off-topic part extraction program installed on the computer 50 causes the computer 50 to function as the below described off-topic part extraction system 200 of the present invention according to an embodiment of the present invention, and may record data such as the below described general corpus, the target domain corpus, or the like to the numerous above described memory devices.

The aforementioned off-topic part extraction program includes a determination module, a score calculation module, a clipping module, and an extraction module. These modules are run on the CPU 1 and result in functioning of the computer 50 as each of the below described determination means 225, score calculation part 230, clipping part 245, and extraction part 250. The computer program may be compressed, or alternatively, may be divided into multiple parts and then recorded on multiple media.

The computer 50 receives input from an input device such as a keyboard 6 or a mouse 7 through a keyboard/mouse controller 5. The computer 50 outputs sound from the speaker 23, or receives input from a microphone 24 through an audio controller 21. The computer 50 is connected through a graphics controller 8 to a display device 11 for providing visual data to the user. The computer 50 is connected to a network through a network adapter 18 (Ethernet (R) card or Tolkien Ring card) or the like, and it is possible to perform communication with other computers or the like.

As explained clearly above, the computer 50 can be readily understood to be a normal personal computer, work station, mainframe computer, or the like information processing system, or a combination of such devices. Furthermore, the above described constituent elements are illustrative, and all of these constituent elements do not form essential constituent elements of the present invention.

Figure 2:
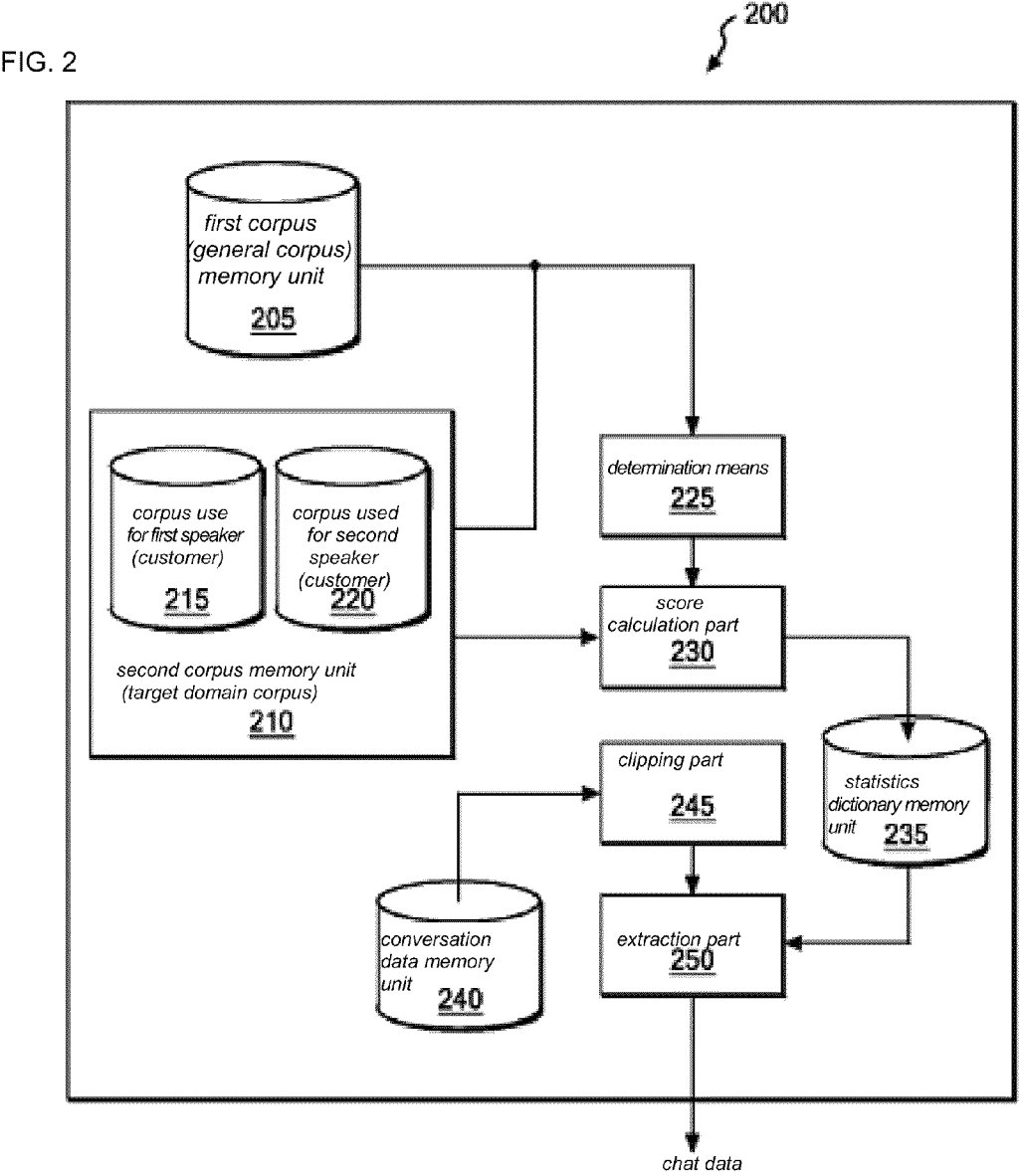
FIG. 2 is a functional block diagram of the off-topic part extraction system 200 according to an embodiment of the present invention.

FIG. 2 is a function block diagram of the off-topic part extraction system 200 for extraction of the off-topic part from the conversation according to the embodiment of the present invention. Within the same figure, the off-topic part extraction system 200 is equipped with a first corpus memory unit 205, a second corpus storage 210, a determination means 225, a score calculation part 230, a dictionary memory unit 235, a conversation data memory unit 240, a clipping part 245, and an extraction part 250.

The first corpus memory unit 205 contains a general corpus that includes documents of multiple fields. When flooring is performed using only the corpus of the target domain to which the conversation target of analysis belongs as in the above described manner, although there is appearance at a certain high frequency in the corpus of the target domain, the resultant applied weight is quite low even for words that combine characteristics as an off-topic part. For example, a PC-related term or an evaluation term such as "like" or the like appears at a high frequency in a financial or the like business transaction and displays a low IDF value in the corpus of the target domain, although such a term also plays a role in identification of the off-topic part interval. On the other hand, for a general corpus that includes documents of multiple fields and thus has a sufficient number of documents in comparison to a corpus of the target domain, the aforementioned term appears at high frequency and does not necessarily display a low IDF value. Therefore according to the invention of the present application, a general corpus is prepared, and terms having such characteristics are not used as the subject of flooring. Details of this method will be explained in relation to the below described determination means 225 and score calculation part 230.

A general corpus that includes documents of multiple fields preferably has sufficient size and preferably includes many types of topics. For example, information on the internet may be used, such as Wikipedia, Twitter, or the like. When Wikipedia is used, an entry page for a single term corresponds to "1 document" when finding the IDF. Moreover, when Twitter is used, a message corresponds to "1 document" when finding the IDF.

The second corpus memory unit 210 stores the corpus of a target domain that includes only documents of a field to which the analysis target conversation belongs. The corpus of the target domain may be converted to text by speech recognition or by manual conversion from a conversation between a person in charge of business and a customer at a call center or business location. However, the second corpus memory unit 210 stores the conversation data separately according to conversation units and per conversation. That is to say, the second corpus memory unit 210 is composed of a customer-use corpus 215 (i.e. collection of the speech part of a first speaker (customer)) and an in-charge person-use corpus 220 (i.e. collection of the speech part of a second speaker (person in charge)). Moreover, each corpus 215 and 220 retains the respective speech part in conversation units rather than as simple data.

The expression "1 document" in the corpus of the target domain that includes both the customer-use corpus 215 and the in-charge person-use corpus 220 means a single conversation composed of a series of speech parts of the person in charge of business in response to a series of speech parts of the customer. On the other hand, the meaning of "1 document" in the customer-use corpus 215 or the in-charge person-use corpus 202 means a single conversation composed of either a series of speech parts of the person in charge of business or a series of speech parts of the customer.

The corpora stored on the first corpus memory unit 205 and the second corpus memory unit 210 each indicates text data composed of word sequences. Since a number of languages, beginning with Japanese, lack a marker such as a blank space or the like as an indicator of the boundary between words, the text data is separated beforehand into words by a computer program using morphological analysis or the like. However, when speech recognition is used, due to output in word units, such word extraction generally is not needed. Moreover, although the corpus might grant associated information such as part of speech, modification, and field (topic), such associated information is not necessary here.

The determination means 225, for each word w included in the corpus of the target domain stored on the second corpus memory unit 210, determines as a lower limit subject word $V_{shared}$ for flooring those words where an IDF value $IDF_g(w)$ in the general corpus stored on the first corpus memory unit 205 and an IDF value $IDF_t(w)$ in the target domain corpus stored on the second corpus memory unit 201 both become lower than a certain threshold value $\theta_1$. In the above described manner, words that have characteristics as an off-topic part and that appear at a certain high frequency within the target domain corpus do not necessarily display a low IDF value when using a general corpus. Therefore according to the invention of the present application, a condition for setting the lower limit subject word $V_{shared}$ for flooring is the IDF value becoming less than or equal to a certain threshold value for the general corpus as well as for the target domain corpus. By this means, greater than necessary flooring is avoided.

Furthermore, the IDF value in each corpus is found by the following formula.

$$IDF(w) = \log\left(\frac{|D|}{DF(w)}\right) \quad \text{[Equation 1]}$$

In the above formula, D indicates the number of documents contained in each corpus, and DF(w) indicates the number documents that include a word w within the documents contained in each corpus.

The score calculation part 230, for each word w included in the target domain corpus stored on the second corpus memory unit 210, calculates the TF-IDF value as a score (score(w)). However, the score calculation part 230 for words determined as lower limit subject words $V_{shared}$ by the determination means 225, uses a lower limit set to the constant μ rather than the TF-IDF value. The score(w) for the word w becomes expressed by the below listed formula.

$$\text{score}(w) = \begin{cases} \mu & (w \in V_{shared}) \\ \log\left(\frac{|D|}{DF(w)}\right) \times CF(w) & \text{(otherwise)} \end{cases} \quad \text{[Equation 2]}$$

In the above listed equation, D indicates the number of documents contained in the target domain corpus, DF(w) indicates the number documents that include a word w within the documents contained in the target domain corpus, and CF(w) indicates the word frequency of the word w within the customer-use corpus 215.

More preferably, rather than the TF value (CF(w)) of the above listed formula, the score calculation part 230 calculates a new characteristic amount RF-IDF using the ratio (i.e. appearance frequency ratio RF(w)) of the appearance frequency CF(w) in the customer-use corpus 215 relative to the appearance frequency SF(2) in the in-charge person-use corpus 220. This is based on the thought that words capable being identified as an off-topic part would appear at higher frequency in the speech part of the customer than in the speech part of the person in charge of business. In this case, the score(w) for the word w is expressed by the following formula.

$$\text{score}(w) = \begin{cases} \mu & (w \in V_{shared}) \\ \log\left(\frac{|D|}{DF(w)}\right) \times RF(w) & \text{(otherwise)} \end{cases} \quad \text{[Equation 3]}$$

In the above listed equation, as an example, the appearance frequency ratio may be found from the following equation.

$$RF(w) = \frac{CF(w) + 1}{SF(w) + CF(w)} \quad \text{[Equation 4]}$$

When the difference becomes important between the score (w) values among words where the value of the appearance frequency ratio RF(w) becomes small, the value of the logarithm of the left part of the above formula may be set to the appearance frequency ratio RF(w). A score(w) for each word calculated by the score calculation part 230 is stored in the dictionary memory unit 235.

The conversation data memory unit 240 contains the text data content of the analysis target conversation partitioned into word units. Generally speech recognition results are partitioned into word units, and so if text data are acquired by speech recognition, there is no need to extract words. On the other hand, when text data are acquired by being written down, the words are extracted from the text data by morphological analysis. Morphological analysis is a previously known technology, and explanation here will be omitted due to the existence of commercially marketed programs for morphological analysis.

Figure 3:
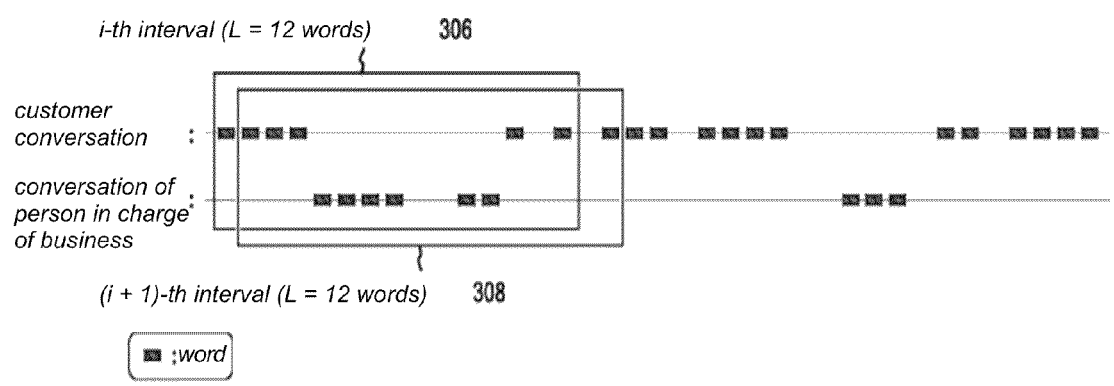
FIG. 3 is a conceptual drawing showing interval clipping processing during an embodiment of the present invention.

The clipping part 245 reads the text data from the conversation data memory unit 240, and while moving a window of a certain length, sequentially clips out processing target intervals. FIG. 3 is a conceptual drawing showing the interval clipping procedure. Within FIG. 3, the individual "-" marks indicate utterances. The upper level 302 indicates a series utterances of the customer. The lower level 304 indicates a series of utterances of the person in charge of business. As shown in FIG. 3, the processing target interval is displaced one word at a time as a window of a certain length L (in the example shown in FIG. 3, L=12 words), and intervals are sequentially cut out (i.e. extraction using the rectangle 306 of the i interval, and using the rectangle 308 of the i+1 interval that is displaced by 1 word).

The processing target interval is preferably short when used for pinpoint detection of the off-topic part interval. However, such a short processing target interval results in a higher possibility of the off-topic part determination results being affected by chance when the off-topic part interval is excessively short. Therefore the certain length L of the window is preferably about several times to several tens of times the average utterance length.

The extraction part 250 references the score(w) for each word contained in the dictionary memory unit 235, calculates an average value of the interval(w) clipped by the clipping part 245, and extracts as an off-topic part those intervals where the calculated average value is greater than a certain threshold value $\theta_2$. The determination formula used by the extraction part 250 is indicated below.

$$\frac{1}{|S_i|} \sum_{w \in S_i} \text{score}(w) \geq \theta_2 \qquad \text{[Equation 5]}$$

In the above listed equation, $S_i$ indicates the word sequences included in the clipped interval, and $|S_i|$ indicates the number of words included in these word sequences.

Furthermore, the certain threshold value $\theta_1$ used during determination of the lower limit subject word $V_{shared}$ for flooring, the score (w) value $\mu$ of the lower limit subject word $V_{shared}$, and the certain threshold value $\theta_2$ used for the off-topic part determination are each set beforehand to give the highest precision of detection results by the aforementioned off-topic part detection method with respect to a small amount of development data having an associated "chat" tag (i.e. correct answer data).

There exist three indicators of precision of the detection results here, i.e. precision, recall, and f-measure (F value).

Recall is an indicator for evaluation of detection failure, and precision is an indicator for evaluation of excessive detection. When one of these two indicators becomes high, the other indicators becomes low, and these indicators have competing precision. Therefore the f-measure exists, normally defined by the following equation, as an indicator that takes into account a balance between these two indicators.

$$f-\text{measure} = \frac{2 \times \text{precision} \times \text{recall}}{(\text{precision} + \text{recall})} \qquad \text{[Equation 6]}$$

However, the maximum value of f-measure occurs when excess detection and detection failures are both within permissible ranges, and this maximum value cannot be said to necessarily be a desirable value. Therefore precision of the indicator is preferably selected application-by-application according to object. For example if lowering of detection failure is emphasized, then a target of recall >90 percent is set beforehand, the threshold values $\theta_1$ and $\theta_2$ and the lower limit subject word $V_{shared}$ score(w) value $\mu$ where precision is highest are set within ranges that satisfy this target.

Furthermore, up to this point the off-topic part extraction technology of the invention of the present application was explained based on the TF-IDF value. However, it is possible for the off-topic part extraction technology of the invention of the present application to use other detection technology for characteristic words as the basis for indication of off-topic part extraction, i.e. to use the mutual information content or the chi-square value. The mutual information content or chi-square value are criteria that indicate the degree of dependence of a word on a category (specific document). It is thus possible to use such criteria rather than the IDF value.

That is to say, for each word w included in the target domain corpus stored in the second corpus memory unit 210, the determination means 225 determines as a lower limit subject word $V_{shared}$ for flooring a word where both the value of the mutual information content $I_g$ (U; D) for the general corpus stored in the first corpus memory unit 205 and the value of the mutual information content $I_t$(U; D) for the target domain corpus stored in the second corpus memory unit 210 become below a certain threshold value. Moreover, the score calculation part 230 uses the mutual information content $I_t$ (U; D) in place of the IDF value, and uses a constant for setting the lower limit for the lower limit subject word $V_{shared}$.

Furthermore, the mutual information content I (U; D) is defined by the following formula using a stochastic variable U indicating the appearance of a certain word t and a stochastic variable D indicating the appearance of a certain document d. Here, U assumes a value of 1 or 0. U=1 indicates an event where the word t appears. U=0 indicates an event where the word t does not appear. In the same manner, D assumes a value of 1 or 0. D=1 indicates an event where the document d appears, D=0 indicates an event where the document d does not appear.

$$I(U; D) = \qquad \text{[Equation 7]}$$
$$\sum_{e_t \in \{1,0\}} \sum_{e_d \in \{1,0\}} P(U = e_t, D = e_d) \log_2 \frac{P(U = e_t, D = e_d)}{P(U = e_t, D = e_d)}$$

In the above listed formula, a specific word is inserted for the suffix t (term), and a specific document is inserted for the suffix d (document).

Moreover, for each word w included in the target domain corpus stored in the second corpus memory unit 210, the determination means 225 determines as a lower limit subject word $V_{shared}$ for flooring a word where both the value of the chi-square value $\chi^2_g(t; d)$ for the general corpus stored in the first corpus memory unit 205 and the value of the chi-square value $\chi^2_t(t; d)$ for the target domain corpus stored in the second corpus memory unit 210 become below a certain threshold value. Moreover, the score calculation part 230 uses the chi-square value $\chi^2(t; d)$ in place of the IDF value, and uses a constant for setting the lower limit for the lower limit subject word $V_{shared}$.

Furthermore, the chi-square value $\chi^2(t; d)$ is defined by the following formula using the actual document count $N_{ij}$ and using a document count $E_{ij}$ anticipated if it is assumed that a certain word and a certain document are independent. Here, i (=$e_t$) assumes a value of 1 or 0. i=1 indicates an event where the word t appears. i=0 indicates an event where the word t does not appear. In the same manner, j (=$e_c$) assumes a value of 1 or 0. j=1 indicates an event where the document d is present, and j=0 indicates an event where the document d is not present.

$$\chi^2(t; d) = \sum_{e_t \in \{1,0\}} \sum_{e_d \in \{1,0\}} \frac{(N_{e_t e_d} - E_{e_t e_d})^2}{E_{e_t e_d}} \quad \text{[Equation 8]}$$

In the above listed formula, a specific word is inserted for the suffix t (term), and a specific document is inserted for the suffix d (document).

When either the mutual information content or the chi-square value is used, the constants that set the lower limit and each type of threshold are set beforehand so for the best precision of detection results by the aforementioned off-topic part detection method with respect a small amount of development data that has an associated "chat tag" (i.e. correct value information).

Figure 4:
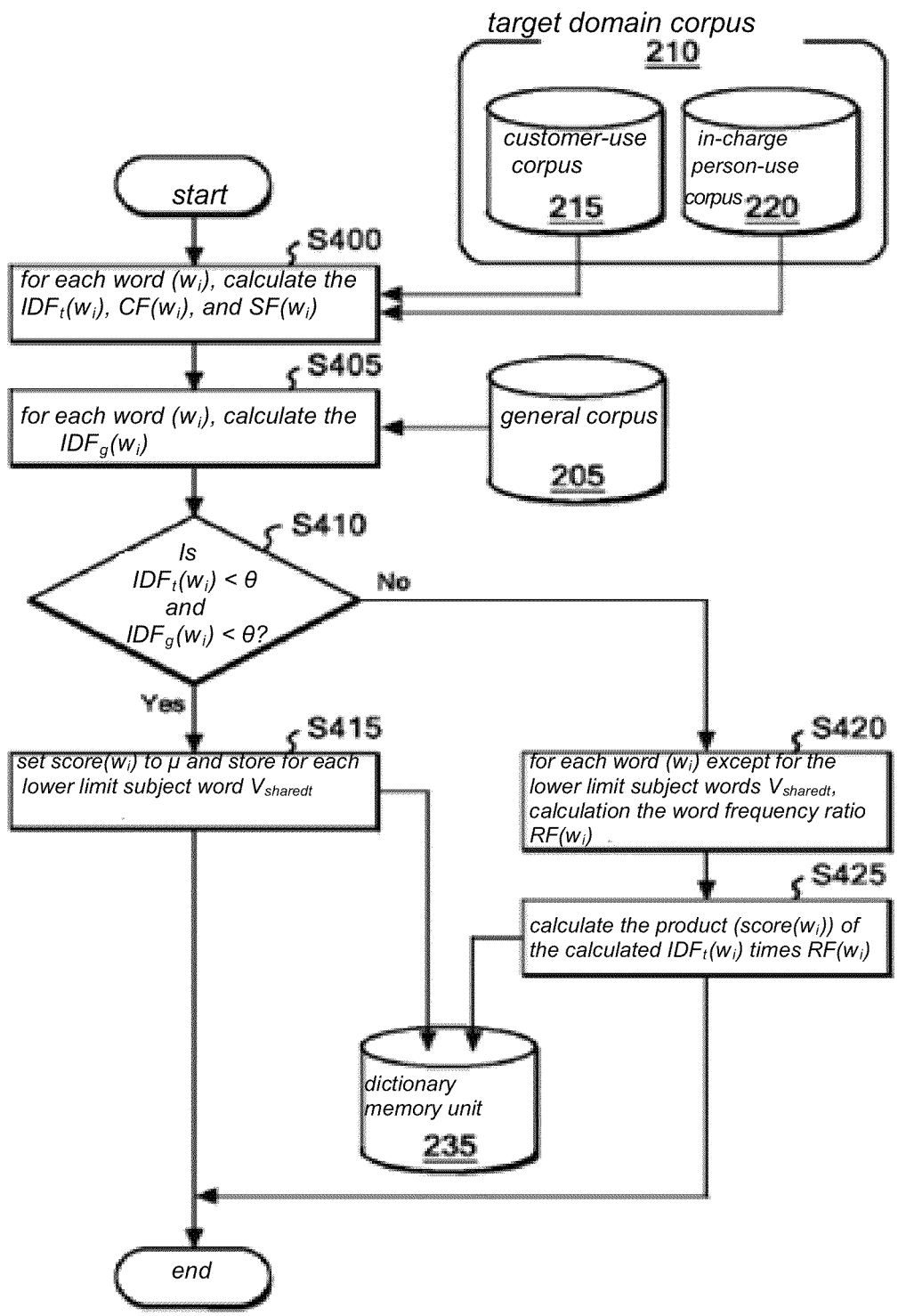
FIG. 4 is a flowchart showing the flow of calculation processing to calculate the characteristic amount RF-IDF for each word.
Figure 5:
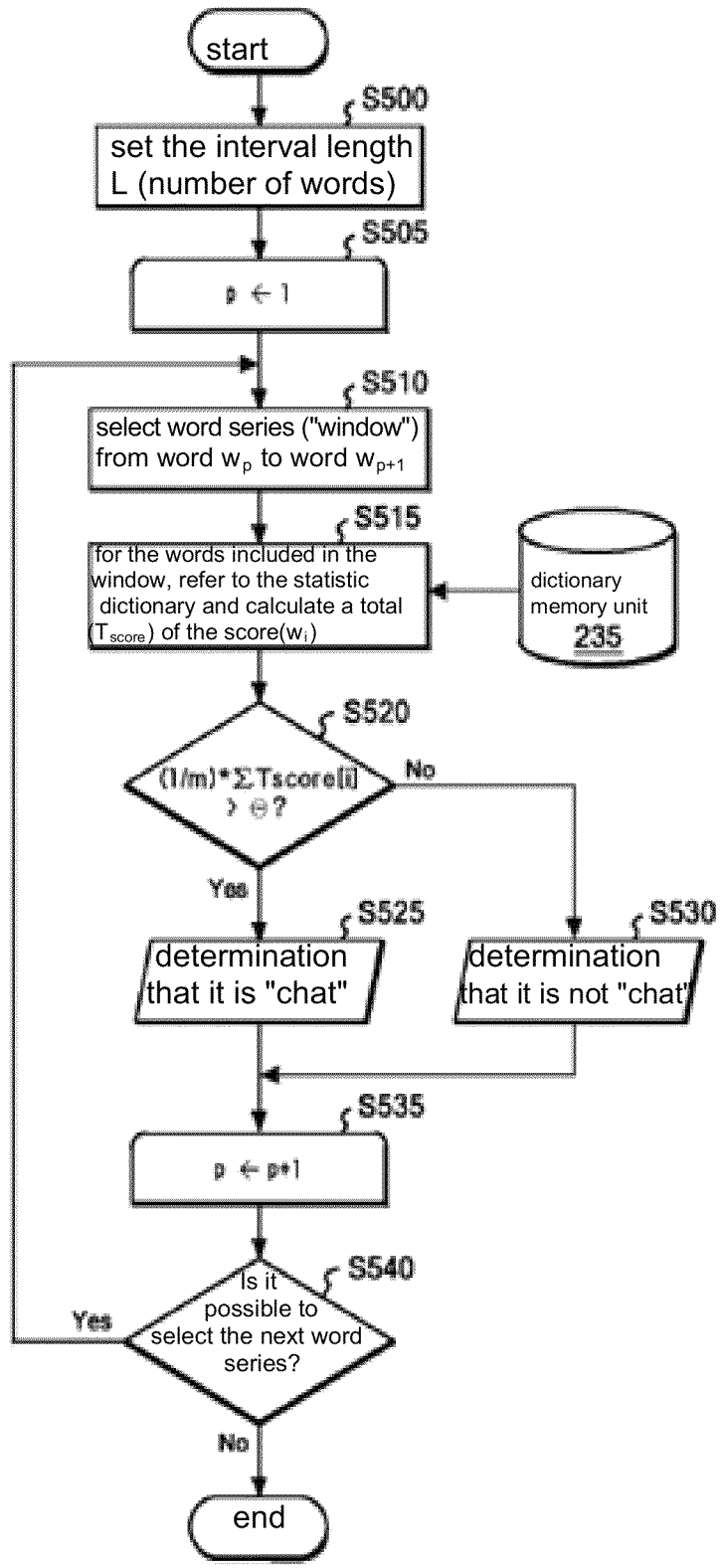
FIG. 5 is a flowchart showing the flow of off-topic part detection processing according to an embodiment of the present invention.

Next, off-topic part detection processing flow by an embodiment of the present invention will be explained while referring to FIG. 4 and FIG. 5. FIG. 4 is a flow chart showing the flow of calculation processing for word-by-word calculation of the characteristic amount RF-IDF. FIG. 5 is a flowchart showing the flow of off-topic part detection processing.

The calculation processing shown in FIG. 4 starts with the step 400. The off-topic part detection system 200 accesses the target domain corpus 210, and for each word $w_i$ included in the target domain corpus 210, finds the IDF value $IDF_t(w)$ in the target domain corpus 210, the appearance frequency CF(w) in the customer-use corpus 215, and the appearance frequency SF(w) in the in-charge person-use corpus 220. Then the off-topic part extraction system 200 accesses the general corpus 205, and for each of the aforementioned words $w_i$, finds the IDF value $IDF_g(w)$ in the general corpus 205 (step 405). During step 400 and step 405, the IDF value is calculated using Equation 1.

Next, the off-topic part extraction system 200, for each of the aforementioned words $w_i$, makes a determination (step 410) of whether the $IDF_t(w_i)$ found during step 400 and the $IDF_g(w_i)$ found during step 405 are both smaller than a certain threshold value $\theta_1$. Next, the off-topic part extraction system 200 determines as lower limit subject words $V_{shared}$ all words $w_i$ where the $IDF_t(w_i)$ and the $IDF_g(w_i)$ are both smaller than the certain threshold value $\theta_1$ (step 410 result=YES). The score($w_i$) (where $w_i \in V_{shared}$) of the words $w_i$ of the lower limit subject word $V_{shared}$ is set to a fixed value $\mu$, and these values are stored in the dictionary memory unit 235 (step 415).

On the other hand, for a word $w_i$ where at least one of $IDF_t(w_i)$ and $IDF_g(w_i)$ is greater than or equal to the certain threshold value $\theta_1$ (step 410 result=NO), the extraction system 200 uses the appearance frequencies CF(w) and SF(w) found during step 400, and according to Equation 4, calculates the appearance frequency ratio $RF(w_i)$ (step 420). Next, for each word except those of the lower limit subject words $V_{shared}$, the off-topic part extraction system 200 sets the score ($w_i$) to the product of $IDF_t(w_i)$ and $RF(w_i)$, and this product is stored in the dictionary memory unit 235 (step 425). Then processing stops.

The off-topic part detection processing shown in FIG. 5 starts at step 500. The off-topic part extraction system 200 sets the interval length L (word count), i.e. unit length for determination whether there is an off-topic part (step 500), and 1 is substituted into the interval index P (step 505). Thereafter, in order from the head of the text data stored in the conversation data memory unit 240, the off-topic part extraction system 200 selects a word sequence ("window") from the word $w_p$ to the word $w_{p+L+1}$ (step 510). Thereafter, the off-topic part extraction system refers to the dictionary memory unit 235 concerning the selected word sequence, calculates a total $T_{score}$ of the score($w_i$) of the words included in the selected sequence (step 515), and further finds a moving average value from the following equation.

$$\frac{1}{|m|} \sum_i Tscore(i) \quad \text{[Equation 9]}$$

$$\text{但し、} i = m \times p, \ldots, p$$

In the above equation, m is the width of the moving average window.

Next, the off-topic part extraction system 200 makes a determination as to whether the calculated moving average value is greater than a certain threshold value $\theta$ (step 520). If the $T_{score}$ is less than or equal to the certain threshold value $\theta$ (step 520 result=NO), the off-topic part extraction system 200 makes a determination that the interval identified at the index P is not an off-topic part (step 530). On the other hand, if the $T_{score}$ is greater than the certain threshold value $\theta$ (step 520 result=YES), the off-topic part extraction system 200 makes a determination that the interval identified at present index P is an off-topic part (step 530). Next, the off-topic part extraction system 200 increments the interval index P by 1 (step 535), and determines whether it is possible to select the next word sequence from among the text data stored in the conversation data memory unit 240 (step 540). If selection is possible (step 540 result=YES), then processing returns to step 510. On the other hand, if selection is not possible (step 540 result=NO), processing ends.

Experimental Result

An experimental result of the present invention will be explained while referring to FIG. 6. The conditions of the test were as follows.

1. General corpus: about 1 month portion of Twitter
2. Target domain corpus: telephone conversations at business branch of financial company
    about 1,000 calls
    converted to text by speech recognition (without correction of errors)

3. Characteristic word detection technology used as base: TF-IDF

4. Comparison method

A. Baseline: The normal TF-IDF score value was used.

B. + Shared word flooring (1): A score value of a certain constant μ was set for lower limit subject words $V_{shared}$ found using two types of corpora, and for other words, the normal TF-IDF was used as the score value.

C. (1)+Frequency ratio weighting: In addition to the aforementioned method B, RF-DFT using the appearance frequency ratio RF, rather than the TF value, was used as the score value.

The values shown in the table of FIG. 6 are respective values indicating 3 types of precision, i.e. the aforementioned precision, recall, and f-measure (F value). Better precision is indicated by a larger value. In comparison to the method A that used the normal TF-IDF as the score value, method B and method C using the present invention both displayed improved values with respect to precision. In particular, attention is called to the remarkable improvement that is seen for the method C that uses the new characteristic amount RF-IDF value as the score value (using the F value).

Although the present invention was explained above using embodiments, the technical scope of the present invention is not limited to the scope described in the aforementioned embodiments. The possibility of adding various types of modifications or improvements to the aforementioned embodiments will be clear to a person skilled in the art. For example, for each word contained in the target domain corpus, the determination means 225 may determine as an upper limit subject word a word that has an IDF value in the target domain corpus and the IDF value in the general corpus that are each greater than or equal to a third certain threshold value. Also, the score calculation part 230 may use a constant as an upper limit rather than the TF-IDF value with respect to an upper limit subject word. Furthermore, the constants used as the third certain threshold value or upper limit are set beforehand so that the precision of the detection results is best according to the aforementioned off-topic part detection method with respect to a small amount of development data having an associated "chat" tag. Therefore, of course, aspects with such added modifications or improvements are included in the technical scope of the present invention.

The execution of all processing (i.e. operation, procedure, step, stage, or the like) of the devices, systems, programs, and methods indicated in the scope of the claims, specification, and figures should be understood to be capable of being done in arbitrary order unless clearly indicated by expressions such as "beforehand," "prior to," or the like or unless later processing uses output from previous processing. Moreover, even when output of prior processing is used during later processing, it should be understood that it is possible to insert other processing between the earlier processing and the later processing, and it should be understood that even when other processing is described as being inserted therebetween, modification is possible such that the prior processing is executed immediately prior to performance of the later processing. Even though explanations were used for convenience that contained terms such as "firstly," "thereafter," "next," or the like in the scope of the claims, specification, and figures, execution is not necessarily restricted to taking place in that order.

What is claimed is:

1. A system for extraction of an off-topic part from a conversation, the system comprising:
   a memory;
   a processing unit connected to the memory;
   a first corpus stored in the memory, the first corpus including documents of a plurality of fields;
   a second corpus stored in the memory, the second corpus including only documents of a field to which said conversation belongs;
   a determination means stored in the memory, the determination means interoperates with the processing unit for determination of, as a lower limit subject word, a word for which IDF value for said first corpus, wherein the IDF value in each corpus is found according to the following formula:

$$IDF(w) = \log\left(\frac{|D|}{DF(w)}\right)$$

, where D indicates the number of documents contained in each corpus, and DF(w) indicates the number of documents that include a word w within the documents contained in each corpus, and IDF value for said second corpus are each below a first certain threshold value for each word included in said second corpus;
   a score calculation part stored in the memory, the score calculation part interoperates with the processing unit for calculation as a score a TF-IDF value, the TF-IDF value being determined based on the product of the term frequency of appearance in a target document and the log of the inverse of the proportion of document frequency of appearance of the term, for each word included in said second corpus, said score calculation part using a constant setting a lower limit rather than a TF-IDF value for said lower limit subject word;
   a clipping part stored in the memory, the clipping part interoperates with the processing unit, the clipping part, while displacing a window of a certain length sequentially over text data comprising words of said conversation acquired by speech recognition, for sequential cutting out of clipped intervals subject to processing from text data comprising words that are contents of said conversation; and
   an extraction part stored in the memory, the extraction part interoperates with the processing unit for extraction of, as an off-topic part of a conversation, a clipped interval where an average value of score of words included in the clipped interval is larger than a second certain threshold value.

2. The system according to claim 1:
wherein said conversation is conversation between a customer and a person in charge of business;
said second corpus is formed from a customer-use corpus that is a collection of speech parts of a customer and an in-charge person-use corpus that is a collection of speech parts of the person in charge of business; and
said score calculation part, rather than TF value of each word w, uses a proportion of appearance frequency CF(w) of said word w in said customer-use corpus relative to appearance frequency SF(w) of said word w in said in-charge person-use corpus.

3. The system according to claim 2:
wherein said proportion is found according to the following formula (CF(w)+1)/(CF(w)+SF(w)).

4. The system according to claim 1:
wherein said determination means, for each word included in said second corpus, further determines, as an upper limit subject word, a word for which IDF value in said first corpus and IDF value in said second corpus each become greater than or equal to a third certain threshold value; and said score calculation part uses a constant setting for said upper limit subject word rather than a TF-IDF value for said upper limit subject word.

5. The system according to claim 1:

wherein said determination means, for each word included in said second corpus, determines as a lower limit subject word a word for which value of mutual information in said first corpus and value of mutual information in said second corpus each become less than or equal to a forth certain threshold value; and said score calculation part uses mutual information content rather than IDF value, and uses a constant for setting a lower limit for said lower limit subject word rather than mutual information content.

6. The system according to claim 1:

wherein said determination means, for each word included in said second corpus, determines as a lower limit subject word a word for which chi-square value in said first corpus and chi-square value in said second corpus each becomes less than or equal to a fifth certain threshold value; and said score calculation part uses chi-square value rather than IDF value, and uses a constant for setting a lower limit for said lower limit subject word rather than chi-square value.

7. An off-topic part extraction method for use with a computer for calculation processing to extract an off-topic part from a conversation:

wherein said computer is capable of accessing a first corpus that includes documents of a plurality of fields, and is capable of accessing a second corpus that includes only documents of a field to which said conversation belongs; and wherein said off-topic part extraction method comprises the steps of:

determining by said computer as a lower limit subject word, for each word included in said second corpus, a word for which IDF value in said first corpus, wherein the IDF value in each corpus is found according to the following formula:

$$IDF(w) = \log\left(\frac{|D|}{DF(w)}\right)$$

, where D indicates the number of documents contained in each corpus, and DF(w) indicates the number of documents that include a word w within the documents contained in each corpus, and IDF value in said second corpus each becomes less than or equal to a first certain threshold value;

calculating by said computer as a score a TF-IDF value, the TF-IDF value being determined based on the product of the term frequency of appearance in a target document and the log of the inverse of the proportion of document frequency of appearance of the term, for each word included in said second corpus, using a constant setting a lower limit rather than a TF-IDF value for said lower limit subject word, and storing said score in a dictionary memory unit;

cutting out sequentially by said computer, from text data comprising words that are contents of said conversation, clipped intervals subject to processing while displacing a window of a certain length; and referencing, by said computer, information stored in said dictionary memory unit, and finding an average value of a score of words included in a clipped interval, and extracting as an off-topic part of a conversation a clipped interval where the average value is larger than a second certain threshold value.

8. The off-topic part extraction method according to claim 7:

wherein said conversation is conversation between a customer and a person in charge of business;

said second corpus is formed from a customer-use corpus that is a collection of speech parts of a customer and an in-charge person-use corpus that is a collection of speech parts of the person in charge of business; and said computer, rather than TF value of each word w, uses a proportion of appearance frequency CF(w) of said word w in said customer-use corpus relative to appearance frequency SF(w) of said word w in said in-charge person-use corpus.

9. A computer program product for extraction of an off-topic part from a conversation between a customer and a person in charge of business, the computer program product comprising:

a non-transitory computer readable medium; and computer program instructions for executing the following method:

determining, by a computer that is capable of accessing a first corpus including documents of a plurality of fields and that is capable of accessing a second corpus including only documents of a field to which said conversation belongs, as a lower limit subject word, for each word included in said second corpus, a word for which IDF value in said first corpus, wherein the IDF value in each corpus is found according to the following formula:

$$IDF(w) = \log\left(\frac{|D|}{DF(w)}\right)$$

, where D indicates the number of documents contained in each corpus, and DF(w) indicates the number of documents that include a word w within the documents contained in each corpus, and IDF value in said second corpus each becomes less than or equal to a first certain threshold value, said second corpus being formed from a customer-use corpus that is a collection of speech parts of a customer and an in-charge person-use corpus that is a collection of speech parts of the person in charge of business;

calculating as a score an RF-IDF value, the RF-IDF value being determined based on the product of a proportion of appearance frequency CF(w) of said word w in said customer-use corpus relative to appearance frequency SF(w) of said word w in said in-charge person-use corpus and the log of the inverse of the proportion of document frequency of appearance of the term, for each word included in said second corpus, using a constant setting a lower limit rather than an RF-IDF value for said lower limit subject word, and storing said score in a dictionary memory unit;

cutting out sequentially intervals subject to processing while displacing a window of a certain length from text data comprising words that are contents of said conversation; and referencing of information stored in said dictionary memory unit, and finding an average value of said score of words included in said clipped interval, and extracting as an off-topic part an interval where said average value is larger than a second certain threshold value, and wherein said proportion of appearance frequency $CF(w)$ of said word w in said customer-use corpus relative to appearance frequency $SF(w)$ of said word w in said in-charge person-use corpus is found according to the following formula $(CF(w)+1)/(CF(w)+SF(w))$.

* * * * *